Nov. 2, 1965 HEINZ-JOSEF REINMOLD 3,214,837
CONTROL MEANS FOR THE MEASURING AND MARKING OF SHEET LENGTHS
Filed Aug. 2, 1962 3 Sheets-Sheet 1

INVENTOR.
HEINZ-JOSEF REINMOLD
BY
*Bauer and Seymour*
ATTORNEYS

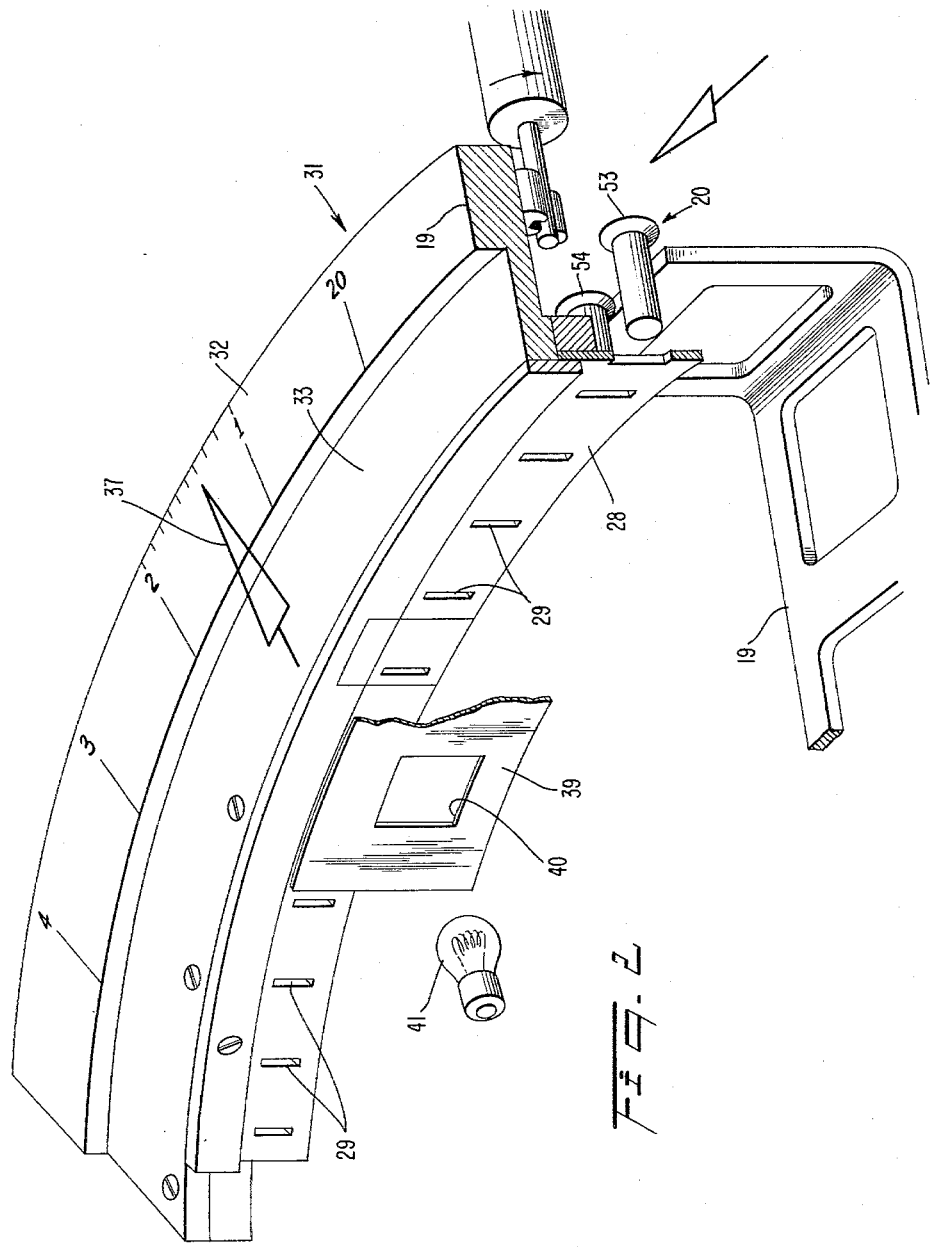

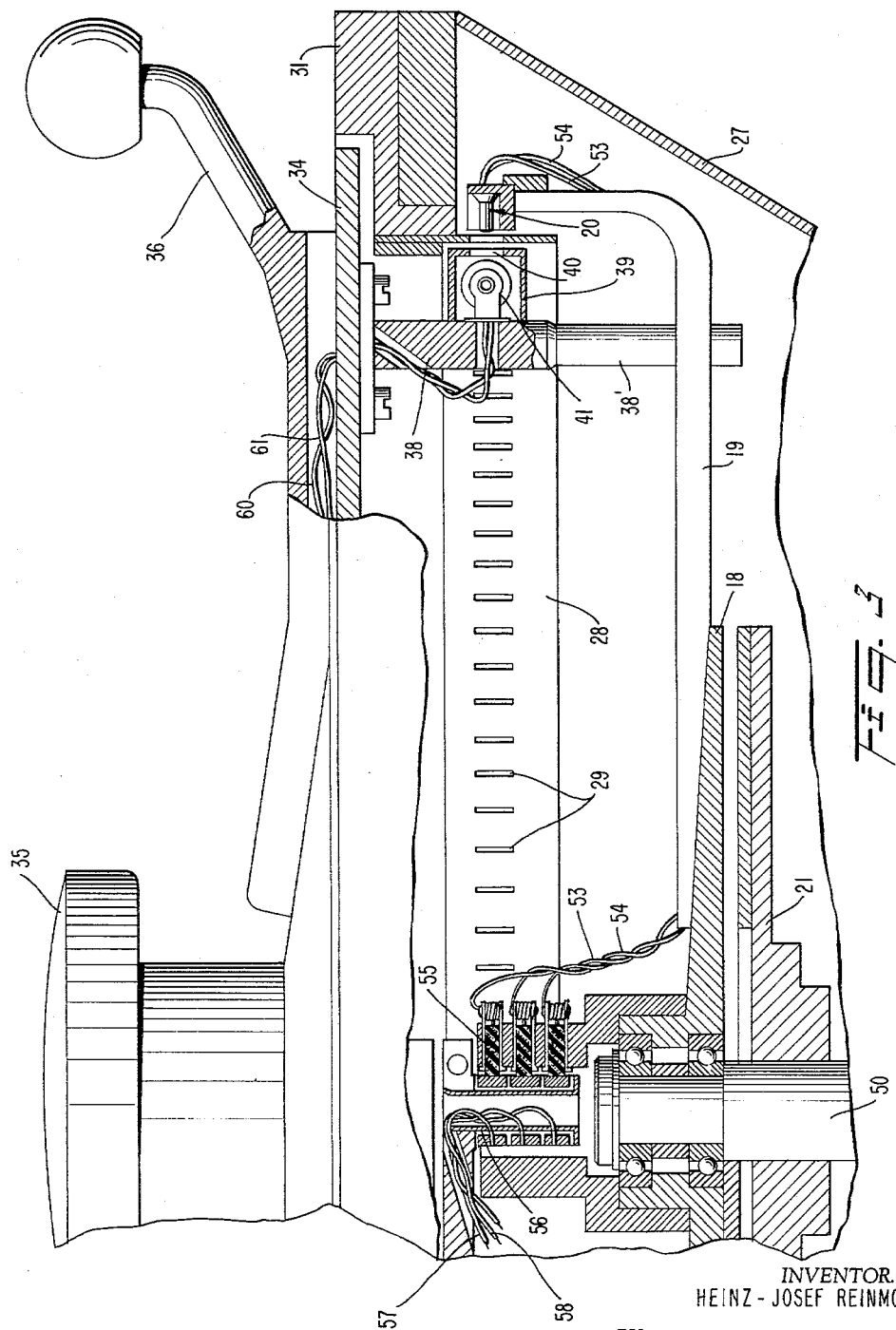

United States Patent Office 3,214,837
Patented Nov. 2, 1965

3,214,837
CONTROL MEANS FOR THE MEASURING AND MARKING OF SHEET LENGTHS
Heinz-Josef Reinmold, Merkstein, Kreis Aachen, Germany, assignor to Compagnie de Saint-Gobain, Neuilly-sur-Seine, France
Filed Aug. 2, 1962, Ser. No. 214,240
Claims priority, application France, Aug. 2, 1961, 869,814
10 Claims. (Cl. 33—141)

This invention relates to control means for the measuring and marking of sheet lengths. This controller is well adapted to use in the cutting of moving glass sheet into suitable lengths. It may be regarded as an apparatus for generating electrical impulses which activate the several mechanisms for supporting, moving, and cutting glass sheet in suitable lengths. Supporting, moving, and cutting mechanisms are not part of this invention, and will be referred to only diagrammatically.

The present invention involves an apparatus for cutting sheet products, particularly glass sheets in predetermined lengths by means of a cutting tool activated by impulses generated in the present mechanism. The invention has, more exactly, as an object an apparatus which measures the displacement of a glass sheet which is carried by a moving carriage, and performs the cutting when the sheet has moved to the length which is to be detached.

In the cutting of glass the so-called cutting is actually a two step operation involving the scribing of the glass along the line of detachment followed by a breaking of the glass at the scribed line. Mechanisms for cutting glass are well known, including diamond pointed scribing tools which are activated by an electric current to score a prescribed line across the glass. In most instances, the operator of the mechanism performs the cutting at the chosen place by pressing a switch button, the selected length of glass having been marked off on the sheet in advance.

It is an object of this invention to produce an apparatus which will correctly measure the length of the sheet which is to be cut off and automatically activate the cutting mechanism. As this invention is particularly adapted for use in the glass factory, it will be described in that use, although it is applicable to the measurement and marking of selected lengths of any sheet material which is regularly moving along a predetermined path.

Before describing the mechanism which is part of this invention it is advisable, with reference to FIG. 1, to consider the support and transportation of glass sheets. In the form of the invention which is being described in this specification, as exemplary, a glass sheet 10 is supported on a conveyor or on a carriage and is presumed to be moving toward the observer. A rail 11 extends over the glass sheet and a movable scribe 12 can be moved electrically along the rail, being energized by an electrical impulse. The carriage which supports the sheet can be started and stopped and is equipped with a brake operable by the reception of an electric impulse, which slows the carriage and stops it. The carriage can also be started again which involves the release of the brake and the activation of the driving motor which is geared to the carriage.

It is an object of the invention to make control means for marking, scribing, and cutting apparatus which can be manually set and will thereafter automatically generate the impulses necessary to the control of the instruments necessary to the several operations involved.

The objects of the invention are accomplished, generally speaking, by control means for marking, scribing, and cutting apparatus adapted, for instance, to the cutting of glass sheet, and the like, to selected lengths which comprises, a scale, graduated in lengths applicable to the cutting of the sheet, a wheel, driven by the sheet, which imparts motion to an arm movable before the scale, detector means, carried by the arm, operably connected to scribing means adjacent the sheet, and means to activate the detector means mounted for motion along, and positioning with respect to, the graduations of the scale.

The apparatus of the invention includes a wheel which is placed in contact with the moving sheet and transfers its own movement to an element such as an arm which swings before a graduated scale, a selector in the nature of a pointer which one adjusts before the graduations of the scale to establish the length of the sheet which is to be cut, and means to transfer the impulses generated, when the arm reaches the position of the pointer, to operating tools.

In the invention the swinging arm carries as many photoelectric cells as there are instruments to be successively activated, and these cells are activated in succession as they reach the position of the pointer. This will be better understood after a consideration of the drawings.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a schematic diagram of the controlling apparatus of this invention operating in connection with a moving glass sheet;

FIG. 2 is a view in perspective, partly sectioned and partly broken away, of a part of the apparatus of FIG. 1;

FIG. 3 is a vertical section taken alongside the central boss of the apparatus.

Figure 1:
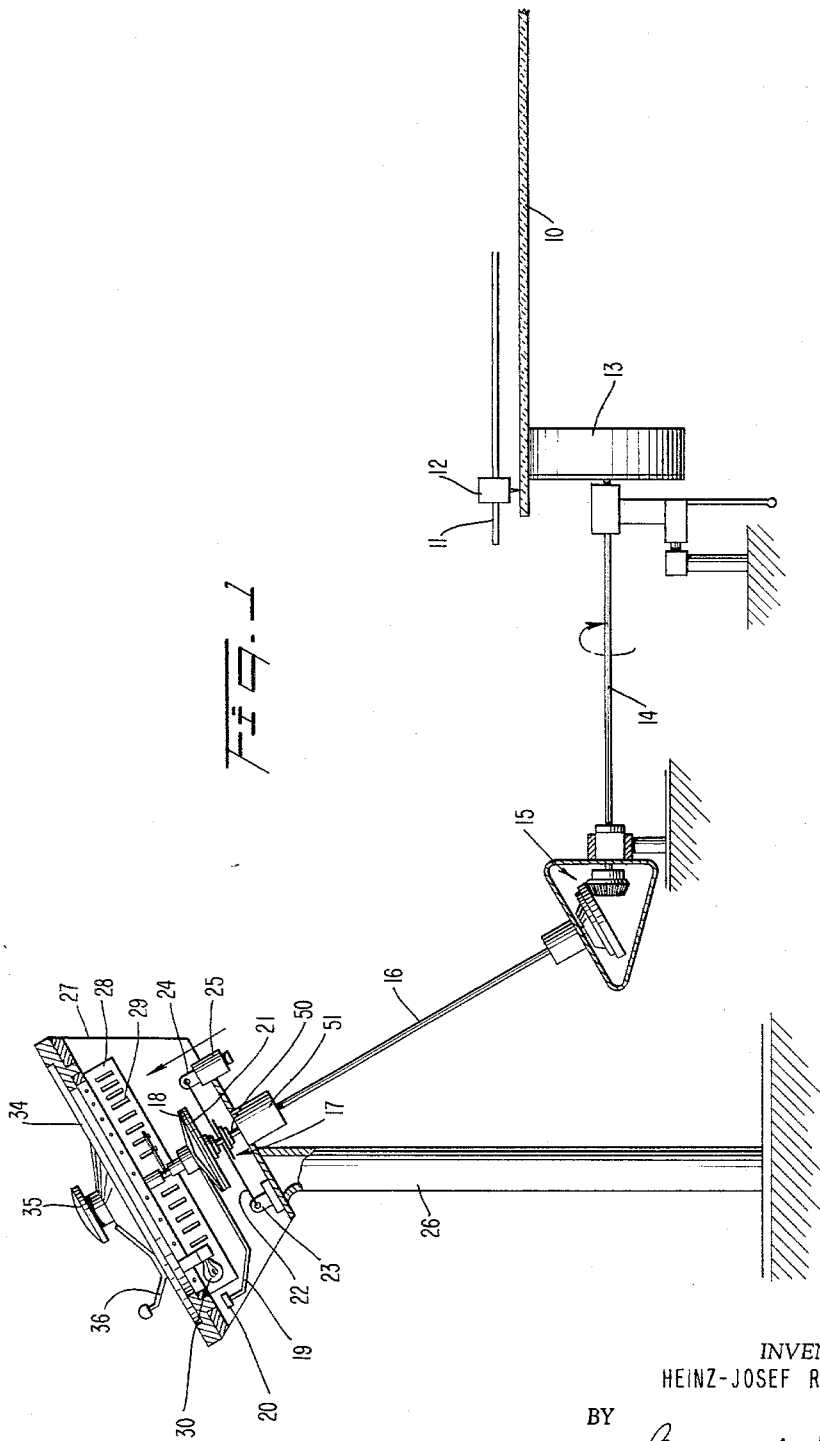

Referring to FIG. 1 the glass sheet 10 is in driving contact with a measuring wheel 13 which drives a shaft 14, gears 15, shaft 16, and clutch 17. The clutch has a rotatable, axially fixed plate 18 to which is attached swinging arm 19 which carries at its end photoelectric cells 20, the disposition of which will be referred to more at length hereinafter. The clutch has an axially movable, rotatable plate 21 which is mounted on a supporting arm 22 which is pivoted at one end to a support 23 and at the other end is attached to an axially movable piston rod 24. When compressed air is let into pneumatic cylinder 25, plate 21 is thrusted against plate 18, and plate 18 is connected to and driven by measuring wheel 13.

The controller as a whole, including the clutch, is mounted on a standard 26 and includes a dark box 27 which is reasonably proof against the admission of strong light from the outside. Within this box there is a circular scale 28 which is provided with spaced apertures 29 which provide for the transmission of light from a light source 30 through a selected aperture to the cells mounted on arm 19. Some of the details of construction are better shown in FIGS. 2 and 3. The box 27 carries a ring 31, an outer thick portion 32 of which is divided into a scale proportioned to the wheel 13. The scale is indicated in FIG. 2 as divided into 20 equal parts, each of which is subdivided into 10 parts. An inner circular area 33 of ring 31 is of reduced thickness to receive the pivoted cover plate 34 (FIG. 3). Attached to the inner edge of the ring 31 is the apertured ring 28, the apertures 29 of which are aligned, in the specific apparatus being described, with the major divisions of the scale 31. The cover plate 34 is pivotally mounted for rotation through a full circle. It is equipped with a central boss 35, a handle 36, and a pointer 37 which is indicated in FIG. 2 to be mounted below the handle and to overlie the scale 31. If one wishes to cut off three units of sheet, one moves the pointer from 0 position to position 3 and sets the apparatus in motion, after which it is self-operating.

Attached to the underside of the cover plate 34 is a post 38 which carries opposite the scale a light tight box 39 having an aperture 40 through which the light from a lamp 41 can reach the selected aperture in ring 28. The post 38 has an extension 38' which is offset and adapted to be engaged by the arm 19 when the last of the cells 20 has been illuminated through the lamp 41 through the selected aperture 29. The size of aperture 40 is made only large enough to illuminate one aperture at a time. The arm 19 is mounted on the clutch plate 18 and turns with it when the clutch is engaged. The clutch plate 18 is free to turn about the shaft end 50 while the clutch plate 21 is keyed thereto. The shaft 50 is turned by shaft 16 through a gear box 51 which establishes any selected ratio between wheel 13 and the motion of arm 19.

Only two activating cells 20 are illustrated but any number could be similarly mounted on the end of arm 19 to initiate as many electrical impulses as desired. The impulses generated in the cells are transmitted by leads 53, 54 to brushes 55, which transmit current respectively through slip rings 56 to appropriate leads 57, 58, which are appropriately connected to operative apparatus such as the brake for the cutting carriage and the scribe 12.

The light 41 is supplied with current by leads 60, 61 which may also pass out through the central boss adjacent leads 57, 58.

A method of operating the device is as follows:

The arm 19 has been returned to zero and the clutch plate 21 has been disengaged. A new sheet of glass approaches the contact roller. The operator sets the handle ahead to the number of units of length on the scale which corresponds to the length of glass to be cut from the sheet. As the leading edge of the glass engages a switch (not shown) a relay (not shown) opens a valve (not shown) which lets compressed air into the pneumatic cylinder 25 and this pneumatic cylinder thrusts the driven plate into engagement with the movable plate 18, starting the arm 19 on its way toward the fixed position of the pointer. The lamp illumines only one slot in the ring. When the leading cell reaches that slot it is activated and transmits current, through the slip ring and one lead, to a brake on the carriage which supports the glass, slowing it down. When the following cell is illuminated by the slot it transmits current through the second slip ring to the second lead to stop the carriage and to set the scribe in motion. At the same time the clutch is disengaged. Arm 19 returns to its original position zero by means of a spring (not shown).

When the cutter has completed the scoring of the sheet an appropriate switch (not shown, mounted on the cutter) is put in to engage the clutch, to set in motion the glass sheet and to remove the cutter to its original position. The same procedure repeats itself now anew.

If another length of sheet is desired the operator can move the pointer 31 by means of handle 36 to any other position during operation.

When the sheet has passed the cutter the carriage receives a new sheet to be measured and scored in the same way.

It is apparent that the device is an apparatus for the successive generation of timed electrical impulses comprising a slotted ring, a light mounted for placement on one side of the ring to illuminate a selected slot, an arm mounted for movement along the opposite side of the slotted ring, at least one photoelectrically responsive means mounted on the arm, and electrically conductive means connected to the photoelectrically responsive means to deliver the impulses received to a place of use.

As many apparently widely different embodiments of the present invention may be made without departing from the spirit and scope thereof, it is to be understood that the invention is not limited to the specific embodiments.

What is claimed is:

1. Control means for sheet scribing apparatus of the type which is useful in glass cutting which comprises a wheel drivable by the sheet which is to be scribed, clutch means driven thereby, a pair of electric cells drivable by the clutch means, light means, an apertured light baffle between the cells and the light means, means to position the light means before a selected aperture in the baffle, means to engage the clutch to drive the cells toward the selected aperture, means to conduct the energy generated by the first cell to a point of use, means to conduct the energy generated by the second cell to a point of use, and means to disengage the clutch.

2. Control means for marking, scribing, and cutting apparatus adapted, for instance, to the cutting of glass sheet and the like, to selected lengths which comprises a plurality of working means for said sheet, a scale graduated in lengths applicable to the cutting of the sheet, a wheel driven by the sheet, an arm movable before the scale, a plurality of detector means carried by said arm, each individually and operably connected to a respective one of said working means adjacent the sheet, means to activate said detector means in sequence, said last-named means being mounted for motion along, and selective positioning with respect to, the graduations of the scale, and clutch means operable to connect said arm for movement by said wheel proportioned to the graduations on said scale.

3. Control means as in claim 2, said arm being automatically returned to zero position with respect to said scale when said clutch is disengaged.

4. A controller for the operation of devices concerned with the successive activation of electrically activable instrumentalities including an apertured scale, a manually movable light adapted to be moved to a position to illuminate a selected aperture, measuring apparatus adapted to engage a sheet for measurement, and an arm proportionally driven by said measuring means carrying at least one electric cell on the other side of the scale from the light and adapted to be activated thereby.

5. Apparatus for the successive generating of timed electrical impulses comprising a slotted ring, a light mounted for placement on one side of the ring to illuminate a selected slot, an arm mounted for movement along the opposite side of the slotted ring, at least one photoelectrically responsive means mounted on the arm, and electrically conductive means connected to the photoelectrically responsive means to deliver the impulses received to a place of use.

6. Apparatus for the successive generation of timed electrical impulses and their application to means for doing work on a moving body including measuring wheel means engageable by the moving body, working means, provided with electrical controls, in place to perform work on the body, and means connecting the wheel means to the working means to control the performance of work by the working means at selected places along the length of the body which comprises a scale having apertures spaced apart by distances which are proportioned to distances on the measuring wheel, light means adapted to illuminate a selected aperture, a plurality of light-responsive means, means to move the plurality in succession past the apertures, means electrically connecting each light-responsive means to a said electrical control, and transmission means connecting the measuring wheel to the means which moves the said plurality past the orifices.

7. Apparatus for the successive generation of timed electrical impulses and their application to means for doing work on a moving body including measuring wheel means engageable by the moving body, working means provided with electrical controls, in place to perform work on the body, and means connecting the wheel means to the working means to control the performance of work by the working means at selected places along the length of the body which comprises timing means including relatively movable light means and a plurality of light responsive means arranged for sequential energization by said light means in response to relative movement therebetween, driving means mechanically connecting said light responsive means to said measuring wheel, and electrical means connecting said light responsive means to said working means.

8. Apparatus for the successive generation of timed electrical impulses and their application to means for doing work on a moving body including measuring wheel means engageable by the moving body, working means, provided with electrical controls, in place to perform work on the body, and means connecting the wheel means to the working means to control the performance of work by the working means at selected places along the length of the body which comprises timing means interposed between the wheel means and the working means including a plurality of light-responsive, current generating means movable as a unit, clutch means mechanically, drivably connecting said plurality of current generating means for movement by said wheel means, a directional light and movable from a zero position to a selected position along the path of movement of said current generating means, and scaled in proportion to the circumference of said wheel means, means including said clutch means to move said light responsive means in succession into a light means emitted by said directional light, means to engage and release the clutch, and means electrically connecting each said light-responsive means to an electrical control for the working means.

9. Timing apparatus, comprising a plurality of control means for working means adapted to act on a moving sheet, which comprises independently movable light means and light responsive means movable in parallel adjacent first and second paths, respectively, said light responsive means comprising a plurality of individual, light responsive means which are spaced apart along said second path by distances proportioned to the lapse of time required between successive operations of the working means, means to move said light means along said first path away from said light responsive means to a position proportioned to a desired length of the moving sheet, means to drive the light responsive means toward said light means at a rate proportioned to the speed of movement of the sheet, and means to energize said control means in succession respectively, by and in response to energization in succession of said plurality of light-responsive means by said light means.

10. In apparatus for timing successive operations of working means to the motion of a length of material, a first movable support, directional light means mounted on said first support, a second movable support, light-responsive means mounted on said second movable support and connected to the working means, means to adjust said first support a distance proportioned to a selected length of the moving material, means to drive said second support at a rate proportioned to the rate of motion of the material until the light-responsive means are illuminated by the directional light means in its adjusted position, said light responsive means including a plurality of light responsive means which are energized in sequence by said light means at a time sequence established by the speed of movement of said second support and the spacing of said light responsive means thereon.

References Cited by the Examiner
UNITED STATES PATENTS

| | | | |
|---|---|---|---|
| 2,046,005 | 6/36 | Sprecker | 265—5 |
| 2,625,300 | 1/53 | Saxe | 177—70 |
| 2,642,663 | 6/53 | Long | 33—132.5 |
| 2,659,563 | 11/53 | Saxe | 250—231 |
| 2,694,804 | 11/54 | Wagner | 33—125 |
| 2,716,818 | 9/55 | Fitler | 33—129 |

ISAAC LISANN, *Primary Examiner.*

ROBERT L. EVANS, *Examiner.*